Aug. 17, 1965     M. MAMON     3,201,606
OVERLOAD PROTECTION IN TRANSISTORIZED
POWER REGULATING CIRCUITS
Filed Dec. 21, 1962

(1) $V_C = V_{OUT}\left(\dfrac{b}{a+b}\right)$ (2) $V_{AB} = V_A - V_C = e_{R_3} - V_{OUT}\left(\dfrac{b}{a+b}\right)$ INVENTOR.
MICHEL MAMON
BY Robert Lieber
ATTORNEY

United States Patent Office 3,201,606
Patented Aug. 17, 1965

3,201,606
OVERLOAD PROTECTION IN TRANSISTORIZED POWER REGULATING CIRCUITS
Michel Mamon, Nutley, N.J., assignor to International Telephone and Telegraph Corporation, Nutley, N.J., a corporation of Maryland
Filed Dec. 21, 1962, Ser. No. 246,436
4 Claims. (Cl. 307—88.5)

This invention relates to a transistorized regulating circuit, for connection between a source of unregulated D.C. and a load, which circuit is capable of efficiently transferring regulated D.C. power to the load under normal load conditions, and in which the power handling transistor is fully protected under severe overload conditions.

The general object of this invention is to provide an efficient transistorized regulating circuit with overload protection.

A more specific object is to provide a transistorized regulating circuit capable of efficiently transferring regulated D.C. power to a load under normal load conditions, and capable of preventing the transfer or dissipation of excessive power through the power handling transistor under severe overload conditions, such as upon the occurrence of a short circuit across the output load terminals.

A feature of the invention resides in the provision, in a transistorized regulating circuit capable of transferring regulated D.C. power to a load under normal load conditions, of low power circuit means for preventing the flow of excessive current through the power handling transistor in series with the load under severe overload conditions, said low power means being arranged so as not to interfere with the efficient transfer of power from the unregulated supply under normal load conditions.

These and other objects and features of the present invention may be more fully appreciated and understood when considered in connection with the following detailed description thereof which is to be read in conjunction with the accompanying drawings wherein.

Figure 1:
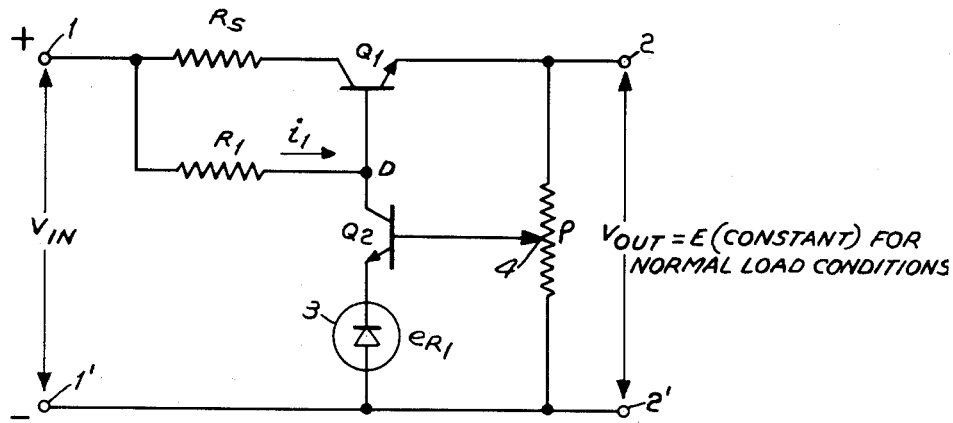
FIG. 1 is a circuit diagram illustrating a prior art regulating circuit with inefficient overload protection.

Referring to FIG. 1, a prior art transistorized regulating circuit, for connection between a source of unregulated D.C. power and a load, typically includes: a pair of input terminals 1–1', across which an unregulated D.C. voltage, indicated as $V_{in}$, is connected, a pair of output terminals 2–2', across which a utilization load is to be connected, and a series circuit, including a variable resistance $R_S$ and a power handling transistor $Q_1$ connected between terminals 1 and 2. Terminals 1' and 2' are connected together and a low power regulating circuit, including a resistor $R_1$, a regulating transistor $Q_2$, and a voltage reference element 3, specifically a zener diode, is connected between terminals 1 and 1', the constant current node, D, of this circuit being connected to the base of $Q_1$ and the collector of $Q_2$. The base of transistor $Q_2$ is connected as shown to the variably positioned wiper arm 4 of a potentiometer P, the resistive ends of which are connected across the output terminals 2–2'.

In operation the circuit of FIG. 1 functions as follows. Under normal load conidtions the output voltage across terminals 2–2' is maintained at a constant level E, with reference to the voltage $e_{R1}$, established by zener diode 3. Should the voltage across terminals 2–2' tend to rise above the level E, transistor $Q_2$ conducts additional base current. The junction D being a constant current circuit node, some of the current flowing through the base of $Q_1$ is diverted to the collector of $Q_2$ proportionately reducing the flow of collector current through the power transistor $Q_1$, thus tending to restore the output level to its nominal value, E. A similar but opposite effect occurs when the voltage across 2–2' tends to drop below the nominal value, as will be immediately apparent to those skilled in this art.

Upon occurrence of an overload condition—e.g., a "near short-circuit" condition across the terminals 2–2'— regulating transistor $Q_2$ is rendered completely ineffective, the voltage at the base thereof becoming negative with respect to that established at the emitter by reference zener diode 3. Accordingly all of the current available at node D tends to flow through the base to emitter circuit path of power transistor $Q_1$. In such regulating circuits therefore, to prevent damage to the high power series transistor $Q_1$, it is the practice to provide a series resistance such as the resistance $R_S$, or an equivalent series switching device, to limit the flow of current through the collector of transistor $Q_1$. This, however, presents an unnecessary hindrance to the flow of load current during normal load conditions, the operating efficiency of the circuit being thus reduced.

Figure 2:
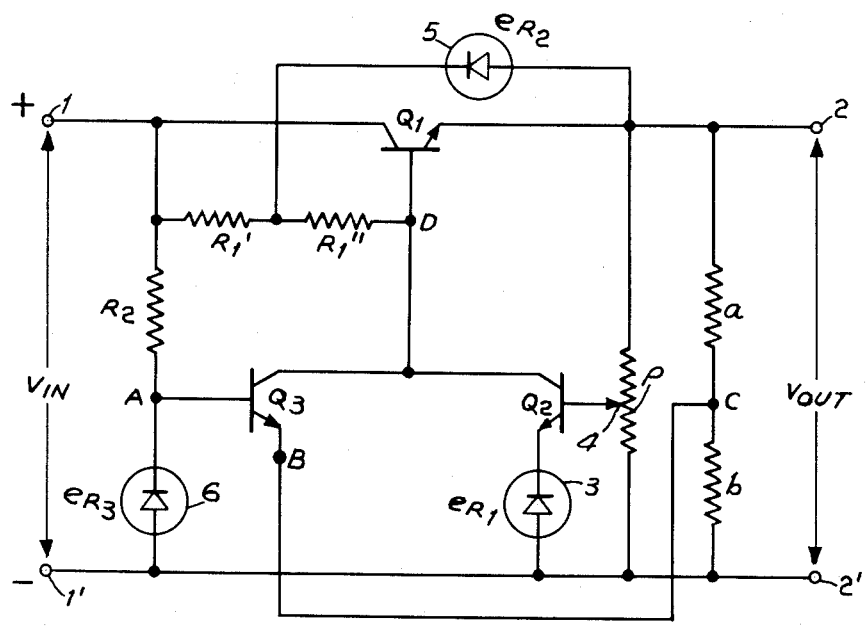
FIG. 2 is a circuit diagram illustrating a transistorized regulating circuit with an efficiently operating overload protection circuit constructed in accordance with the present invention.

To avoid excessive overload currents without a reduction in circuit efficiency, the circuit shown in FIG. 2 has been devised. The circuit of FIG. 2 contains no impedance between transistor $Q_1$ and the load, the overload protection function thereof being performed by the overload protection transistor $Q_3$ in combination with the voltage divider formed by the resistors $a$ and $b$, as will be clear from the discussion below, but without dissipation of overload power from the unregulated source. The circuit of FIG. 2 includes the following in addition to the components shown in FIG. 1, the identifying descriptions of unchanged elements being retained. First, in order to more closely regulate the current flowing between the base and emitter of power transistor $Q_1$ the resistor $R_1$ is split into series resistor $R_1'$ and $R_1''$, the junction of which is connected, through a voltage reference zener diode 5, to output terminal 2. Also, the junction C, of the voltage divider formed by the resistors $a$ and $b$ across terminals 2–2', is connected to the emitter terminal B of overload protection transistor $Q_3$, the collector of which is connected to the collector of $Q_2$ and the base of $Q_1$ at the constant current node D. A resistor $R_2$ and zener diode 6 are connected in series between terminals 1–1', and the reference voltage, at the junction A thereof, is applied to the base of $Q_3$.

With respect to the voltage at terminal 1', the voltage at terminal C may be expressed as $$V_C = V_{out}\left(\frac{b}{a+b}\right)$$

Thus, the base of emitter voltage of $Q_3$ can be expressed as $$V_{AB} = V_A - V_C = e_{R3} - V_{out}\left(\frac{b}{a+b}\right)$$

In accordance with the present invention the values of resistance of resistors $a$ and $b$ are so chosen that under normal load conditions $V_{AB}$ is less than zero, the transistor $Q_3$ being accordingly blocked during normal load operation. The movable wiper arm 4 of potentiometer P is then set so that as the transistor $Q_2$ becomes blocked because of an overload across terminals 2–2', the voltage $V_C$ becomes less than the voltage $V_A$, transistor $Q_3$ being thus rendered conductive just as the voltage at the base of $Q_2$ passes out of the normal regulating range. In this manner, transistor $Q_3$ diverts the excess current at constant current node D which would otherwise pass into the base of transistor $Q_1$.

It is thus clear that two inherent advantages accrue from the circuit of FIG. 2, the first being that under severe overload conditions wherein the output voltage is reduced beyond the regulating range of $Q_2$, the current handling function of $Q_2$ is assumed by the low power protective transistor $Q_3$ while the output voltage is limited by the reference diode 5, and the second being that the diode 5 provides additional stabilization under normal load conditions.

I have found that practical component values for the circuit shown in FIG. 2 are as follows:

$R_1' = R_1'' = 470$ ohms;
Normal current through transistor $Q_1 = 1$ ampere;
Critical (minimum) output voltage $= .005 \times V_{in}$;
$V_{in} = 60$ volts;
$V_{out} = 50$ volts;
Critical load 0.1 ohm;
Transistor $Q_1$ is of the type 2N1068;
Transistor $Q_2$ is of the type 2N388;
Transistor $Q_3$ is of the type 2N388;
Zener diodes 3, 5, and 6 are of the type 1N721;
The resistances of resistors $a$, $b$, $R_2$ are respectively equal to 18K, 470 and 27K ohms.

While I have described above the principles of my invention in connection with specific apparatus, it is to be clearly understood that this description is made only by way of example and not as a limitation to the scope of my invention as set forth in the objects thereof and in the accompanying claims.

Accordingly I claim:

1. A regulating circuit for delivering regulated D.C. power from an unregulated D.C. source to a load comprising in combination
   an input terminal,
   an output terminal,
   a high power transistor connected in series between said input and output terminals,
   a common terminal for connection with said input terminal across an unregulated source of D.C. voltage and for connection with said output terminal across a load,
   a low power regulating network connected between said input terminal and said common terminal, said network having a constant current node connected to the base of said high power transistor, said constant current node being coupled to said common terminal through the series combination of a first regulating transistor and a first voltage-reference diode,
   a voltage divider network connected between said output and common terminals and including an intermediate reference voltage junction, and
   means normally inoperative under ordinary load conditions connected between said constant current node and said reference voltage junction of said voltage divider network for conducting current away from said constant current node upon occurrence of a severe overload condition between said output and common terminals, said last-named means including an overload-protection transistor, the potential of the base electrode of said overload-protection transistor being determined by a second voltage-reference diode, said second voltage-reference diode being coupled between said base electrode and said common terminal.

2. A regulating circuit for efficiently transferring regulated D.C. power from an unregulated D.C. source to a load comprising
   an input terminal,
   an output terminal,
   a common terminal for connection with said input terminal across a source of unregulated D.C. voltage and, for connection with said output terminal across a load,
   a high power transistor having collector and emitter electrodes connected serially between said input and output terminals and having a base electrode,
   a regulating network connected between said input and common terminals and including
      a tapped resistance connected at one end thereof to said input terminal and at the other end thereof to the base of said high power transistor and having an intermediate terminal tap,
      a low power regulating transistor having one electrode of its emitter and collector electrodes connected to the other end of said tapped resistance,
      a voltage reference element connected between the other of said emitter and collector electrodes of said regulating transistor and said common terminal, and
      a voltage-reference diode coupled between said intermediate terminal tap and said output terminal,
   first circuit means connected between said output and common terminals and having an output connection to the base electrode of said regulating transistor for supplying a control potential to said regulating transistor,
   second circiut means connected between said input and common terminals and having an output connection maintained at a constant reference voltage with respect to said common terminal,
   third circuit means connected between said output and common terminals and having an output connection at which is established a voltage which varies in proportion to the voltage at said output terminal, and
   an overload protection transistor having base and emitter electrodes connected between the said output connections of said second and third circuit means, and having a collector electrode connected to said other end of said tapped resistance.

3. A regulating circuit according to claim 2 in which the impedances of the components in said third circuit means are so selected that the voltage at said output connection thereof maintains said overload protection transistor blocked during normal load conditions, and unblocks said transistor under conditions of severe overload.

4. A regulating circuit for efficiently transferring D.C. power from a source of unregulated D.C. to a load comprising
   an input terminal,
   an output terminal,
   a common terminal for connection in combination with said input terminal across a source of unregulated D.C., and for connection in combination with said output terminal across a load,
   a high power transistor, having base collector and emitter electrodes, connected serially between said input and output terminals, one of said collector an emitter electrodes being directly connected to the input terminal and the other being directly connected to the output terminal,
   a low power dissipating regulating circuit connected between said input and common terminals including
      a tapped resistance, including a series combination of first and second resistors, connected at one end thereof to said input terminal and at the other end thereof to the base electrode of said power transistor,
      a first voltage reference element connected between the junction of said first and second series resistors and said output terminal,
      a regulating transistor having a collector electrode connected to the base of said power transistor and having emitter and base electrodes,
      a second voltage reference element conncted between the emitter electrodes of said regulating transistor and said common terminal, and an attenuating circuit connected between said output and common terminals and having an output connected to the base electrode of said regulating transistor, and an overload protection circuit connected to the base electrode of said high power transistor and to said input, output, and common terminals, including an overload protection transistor having a collector electrode connected to the base electrode of said high power transistor and also having emitter and base electrodes, a reference circuit including the series combination of a resistor and a third voltage reference element connected between said input and common terminals, the junction of said resistor and reference element being connected to the base of said protection transistor, and a voltage divider circuit including at least two resistors connected between said output and common terminals with an intermediate tap point between said resistors connected to the emitter electrode of said protection transistor.

References Cited by the Examiner

UNITED STATES PATENTS

| | | | |
|---|---|---|---|
| 3,074,006 | 1/63 | Klees | 307—88.5 |
| 3,078,410 | 2/63 | Thomas | 323—22 |
| 3,104,353 | 9/63 | Theobald | 307—88.5 |

DAVID J. GALVIN, *Primary Examiner.*